United States Patent
Cannas et al.

(10) Patent No.: US 7,130,106 B2
(45) Date of Patent: Oct. 31, 2006

(54) SOL-GEL NANOCOATED PARTICLES FOR MAGNETIC DISPLAYS

(75) Inventors: Carla Cannas, Elmas (IT); Peter M. Kazmaier, Mississauga (CA); Gabriel Iftime, Mississauga (CA)

(73) Assignee: Xerox Corporation, Stamford, CT (US)

( * ) Notice: Subject to any disclaimer, the term of this patent is extended or adjusted under 35 U.S.C. 154(b) by 36 days.

(21) Appl. No.: 10/889,293

(22) Filed: Jul. 12, 2004

(65) Prior Publication Data
US 2006/0007526 A1    Jan. 12, 2006

(51) Int. Cl.
G02B 26/00 (2006.01)
G03G 17/04 (2006.01)
G09G 3/34 (2006.01)

(52) U.S. Cl. ............... 359/296; 430/34; 345/107
(58) Field of Classification Search ............ 359/280, 359/296; 430/32, 34, 38; 345/107; 204/450
See application file for complete search history.

(56) References Cited

U.S. PATENT DOCUMENTS

| | | | |
|---|---|---|---|
| 5,411,398 A | 5/1995 | Nakanishi et al. | |
| 5,846,630 A | 12/1998 | Tazaki et al. | |
| 5,972,493 A | 10/1999 | Iwasaki et al. | |
| 6,017,584 A | 1/2000 | Albert et al. | |
| 6,097,531 A | 8/2000 | Sheridon | |
| 6,479,146 B1 * | 11/2002 | Caruso et al. | 428/403 |
| 6,525,866 B1 | 2/2003 | Lin et al. | |
| 6,529,313 B1 | 3/2003 | Lin et al. | |
| 6,574,034 B1 | 6/2003 | Lin et al. | |
| 6,577,433 B1 | 6/2003 | Lin et al. | |
| 6,870,661 B1 * | 3/2005 | Pullen et al. | 359/296 |

OTHER PUBLICATIONS

R.A. Caruso and M. Antonietti, "Sol-Gel Nanocoating: An Approach to the Preparation of Structured Materials," *Chem. Mater.* 2001, 13, 3272-3282.
A.P. Philipse, M.P.B. Van Bruggen and C. Pathmamanoharan, "Magnetic Silica Dispersions: Preparation and Stability of Surface-modified Silica Particles with a Magnetic Core," *Langmuir* 1994, 10, 92-99.

* cited by examiner

*Primary Examiner*—Ricky Mack
*Assistant Examiner*—William Choi
(74) *Attorney, Agent, or Firm*—Pepper Hamilton LLP

(57) ABSTRACT

Magnetic display devices include low-density silica coated magnetic and nonmagnetic particles. In a one-particle system, low-density silica coated magnetic particles coated by a sol-gel process are used in combination with non-magnetic particles. In a two-particle system, low-density silica coated magnetic particles coated by a sol-gel process are used in combination with low-density silica coated non-magnetic particles. Display devices employing silica coated magnetic particles minimize the tendency of the magnetic particles to aggregate. Silica coated magnetic particles in a display device results in a magnetic display with improved image stability. Low-density silica coated magnetic particles in a display device allow for particles to move easily through a dispersion fluid in response to a magnetic field.

6 Claims, 3 Drawing Sheets

SOL-GEL NANOCOATED PARTICLES FOR MAGNETIC DISPLAYS

TECHNICAL FIELD

The present invention relates to magnetic displays, and in particular magnetic particles and/or nonmagnetic particles for magnetic displays, wherein the particles are silica coated by a sol-gel process.

BACKGROUND

Magnetic display devices generally utilize a magnetic force to move magnetic particles into a display image. For example, a magnetic display system may include a transparent plastic sheet formed over a surface of honeycomb-shaped cells or cavities, each cavity being filled with a white pigment fluid and magnetic particles. A magnetic field may be applied to the display surface to move the particles into a display image, such as through a rod-like magnetic pen.

Various methods of making a magnetic display are known in the art. For example, a magnetic display may include cells containing spherical-shaped magnetic and non-magnetic particles in fluid sealed between two plates or substrates. In one such system, the particles may include magnetic particles having one color (e.g., black) and non-magnetic particles having another color (e.g., white). A graphic may be initiated on the display by scanning a magnet on or near one or more of the display plates so as to attract one of the two colored particles to the desired surface. While making contact with the surface of the magnetic display using a magnetic pen, the magnetic particle in the area of contact moves to the surface and an image appears.

Various improvements to magnetic displays have been proposed in the art. For example, U.S. Pat. No. 6,097,531, herein incorporated by reference, describes a display system wherein both magnetic fields and electric fields may be applied for addressing, aligning, and moving the elements into place within a display. As another example, U.S. Pat. No. 5,846,630, herein incorporated by reference, describes a magnetic display panel including a dispersion fluid layer composed of a magnetic particle, a dispersion medium, a thickening agent, and a coloring material on a substrate. U.S. Pat. No. 5,411,398, herein incorporated by reference, describes a magnetic display system wherein light-absorptive magnetic particles and light-reflective non-magnetic particles are encapsulated in microcapsules.

As another example, U.S. Pat. No. 5,972,493, incorporated herein by reference, describes gelatin microcapsules for magnetic display, wherein the microcapsules contain a dispersion medium of two solvents and magnetic powder and nonmagnetic powder. Ferromagnetic particles of about 400–800 μm diameter are used. In one embodiment of the magnetic displays described in the '493 Patent, the magnetic and nonmagnetic particles are affinity-treated in order to facilitate particle movement within the display. In one example, a mixture of alumina and silica was used as water-bearing metal oxides. The coating with water-bearing metal oxides is about 1% to 16% by weight of the particle.

Other examples of displays which incorporate magnetic and non-magnetic particles or powders are described in U.S. Pat. Nos. 6,577,433; 6,574,034; 6,529,313 and 6,525,866, each of which is incorporated herein by reference in its entirety. In these patents, a magnetic display device has a number of individual reservoirs, each containing a transparent or colored fluid dispersion medium and two sets of particles, each reservoir being separated within the device by a spacer. In these patents, one embodiment is described wherein within the reservoirs the two sets of particles of the display fluid are encapsulated in a metal oxide shell, preferably a titania shell or silica shell. Encapsulation of particles in a metal oxide shell improves the electrical mobility properties of the particles while retaining the optical or colorant functionality of the underlying particles encapsulated therein.

There are some problems among the magnetic devices comprising both magnetic particles and non-magnetic particles that are available to date. Magnetic and non-magnetic particles used in magnetic displays generally have high density. Thus, magnetic and non-magnetic particles tend to settle within the display device, which results in the loss of image stability over time. Moreover, bare magnetic and non-magnetic particles have a strong tendency to aggregate, and thus require higher magnetic fields for moving. Aggregation decreases resolution of the display. Attempts to produce particles dispersed in a polymer as opposed to an aqueous fluid have been successful for non-magnetic particles to some extent, but magnetic particles, dispersed in a polymer may still have the tendency to aggregate.

SUMMARY OF THE INVENTION

Coating magnetic and/or non-magnetic particles by a sol-gel process may produce reduced-density particles for use in magnetic displays. Aggregation of particles in a magnetic display device may be decreased. High-quality resolution of a magnetic display may be provided without having to supply higher magnetic fields through the use of reduced-density magnetic and non-magnetic particles. Reduced-density magnetic and non-magnetic particles allow for magnetic displays to maintain their image over time.

A magnetic display device may comprise a pair of substrates and a dispersion medium located between the substrates, wherein the dispersion medium comprises silica coated magnetic particles and non-magnetic particles, wherein the silica coated magnetic particles have an isoelectric point of about 2 to about 4 and a density of about 1.4 g/cm$^3$ to about 3.0 g/cm$^3$. A magnetic display device may comprise a pair of substrates and a dispersion medium located between the substrates, wherein the dispersion medium comprises silica coated magnetic particles and silica coated non-magnetic particles, wherein the silica coated particles have an isoelectric point of about 2 to about 4 and a density of about 1.4 g/cm$^3$ to about 3.0 g/cm$^3$. A magnetic field and/or an electric field may be supplied to one or both substrates in order to position the magnetic/non-magnetic particles into a image display. The dispersion medium may be a gas, such as air, or it may be an aqueous or non-aqueous liquid. The dispersion medium comprising the particles may be held in a plurality of reservoirs or cells.

A magnetic display device may be manufactured by mixing silicate solution with particles having a density of about 3–6 g/cm$^3$, titrating the mixture with HCl to a pH of about 10, removing soluble sodium silicates and aggregated particles to obtain the particles which are thinly coated with silica, dispersing the thinly coated particles in ethanol, ammonia, and tetraethoxysilane (TEOS), stirring to form silica coated magnetic particles having a density of about 1.4 to about 3.0 g/cm$^3$, and inserting the particles in a dispersion medium between two substrates of a display device.

BRIEF DESCRIPTION OF THE DRAWINGS

In part, other aspects, features, benefits and advantages of the embodiments will be apparent with regard to the following description, appended claims and accompanying drawings where:

DETAILED DESCRIPTION

Before the present compositions and methods are described, it is to be understood that this invention is not limited to the particular processes, compositions, or methodologies described, as these may vary. It is also to be understood that the terminology used in the description is for the purpose of describing the particular versions or embodiments only, and is not intended to limit the scope of the present invention which will be limited only by the appended claims.

It must also be noted that as used herein and in the appended claims, the singular forms "a", "an", and "the" include plural reference unless the context clearly dictates otherwise. Thus, for example, reference to a "particle" is a reference to one or more particles and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference. Nothing herein is to be construed as an admission that the invention is not entitled to antedate such disclosure by virtue of prior invention.

Magnetic display devices and their designs are generally known in the art. The use of silica coated magnetic and/or nonmagnetic particles is not necessarily limited to magnetic display devices. Accordingly, any display device that may use silica coated magnetic and/or nonmagnetic particles may be designed accordingly.

A magnetic display may show words or pictures when a magnetic and/or electric force is applied to the display. Examples of such display devices include magnetic display sheet and electronic paper devices. The magnetic display sheet or magnetic display medium according to the several embodiments may record words or pictures with a magnet. Methods for recording words or pictures on the magnetic display sheet or medium are well known in the technical field. Any traditional method for recording, erasing and displaying the words or pictures that are known in the field may be used.

Figure 1:
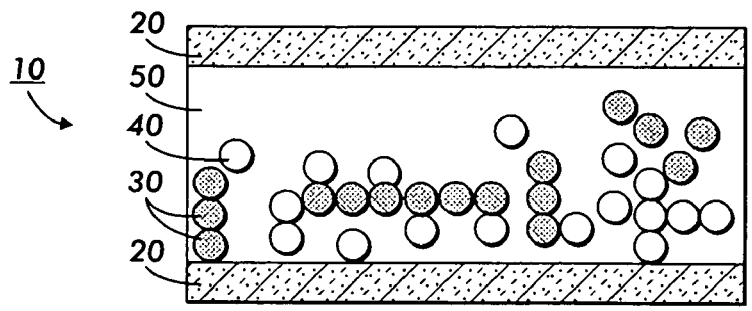
FIG. 1 illustrates a side view of a display device according to the prior art.

In FIG. 1, a magnetic display device of the prior art is illustrated. A magnetic display device 10 comprises magnetic particles 30 and non-magnetic particles 40 dispersed in a dispersion medium 50 between two substrates 20. The magnetic particles may be made of one material and color (such as magnetic with a black pigment), while the non-magnetic particles may be made of a different material and color (such as titania with a white pigment). Other materials and colors are possible. In prior art magnetic displays, the magnetic particles tend to aggregate, leading to low stability in image display. The nonmagnetic particles also tend to aggregate. To reduce this problem, it may be desirable to silica coat the magnetic and/or the non-magnetic particles in order to lower the density of the particles and to avoid aggregation of the particles.

For the substrates of the magnetic display device, any materials known and used in the art may be selected. At least one of the substrates, in particular at least the top substrate through which the images formed by the device must be viewed, should be transparent in order to enable such viewing. Both substrates may be transparent, if desired. Of course, the bottom or back substrate need not be transparent, and may instead be, for example, a light reflecting or light absorbing material. Suitable materials may include conductive plastic films, for example plastic films coated with indium tin oxide (ITO) such as polyethylene terephthalate (PET) films; conductive glass films such as ITO coated glass; and conductive thin metals. The substrates may also be made of polyethylene film, polypropylene film, chlorovinyl film, polyester film, and polycarbonate film. For transparency, ITO coated plastic and glass films are preferred.

Preferably, the substrates that sandwich the dispersion medium have a length and width corresponding to the overall length and width of the magnetic display device. The substrates are thus preferably continuous, unitary films. The substrates are preferably thin while still maintaining appropriate conductive properties and structural integrity. For example, in certain embodiments substrates may have a height (i.e., thickness) of from about 20 microns to about 100 microns. Other thicknesses, sizes and compositions are possible.

A magnetic and/or electric force may be applied to one or both substrates in order to position the magnetic and non-magnetic particles into a suitable image. Such methods of supplying a magnetic and/or electric field are well known in the art. For example, in one embodiment, an electric current is applied to align the non-magnetic particles. When a direct-current electric field of an appropriate polarity is applied across a substrate, the particles move to a viewed surface of the display and scatter light. When the applied electric field is reversed, the non-magnetic particles move to the rear surface of the display and the viewed surface of the display then appears dark. As another example, a two-particle system may be designed. Upon application of an electric field across a substrate of the display, the first set of particles moves toward a first electrode displacing the second set of particles toward the second substrate. If the electric field is reversed, the first set of particles moves toward the second electrode and the second set of particles moves toward the first electrode.

One or more cells or individual reservoirs, each filled with dispersion medium (i.e., a magnetic display medium comprising magnetic and non-magnetic particles), may be sandwiched between the conductive film substrates. Each of the individual reservoirs defines one container and/or cell of the magnetic display fluids within the display device. These cells may be designed to contain different magnetic and/or non-magnetic particles. For example, one cell may contain a single particle, while another cell may contain both magnetic and non-magnetic particles. Any number of suitable designs are possible. As another example, cells containing two sets of particles may be included in the magnetic display, wherein the two sets of particles exhibit different contrasting color and different charging properties from each other.

If the magnetic display device is designed with more than one cell, a spacer may keep the individual reservoirs separate from one another. Any suitable spacer design may be used. One such spacer is described in U.S. Pat. No. 6,577,433, incorporated herein by reference in its entirety. As described therein, the width and/or diameter of the individual reservoirs may be from, for example, about 5 microns to about 200 microns. Other sizes are possible. Obviously, the display medium to be used within the reservoirs must contain particles of a size smaller than the reservoir width/diameter in order to function.

As another possible design of the display device, the display device may include two substrates and/or sheets positioned opposite to each other with a number of capsules containing anisotropic particles, with the capsules dispersed in a fluid, located between the substrates. Suitable display devices utilizing encapsulated microspheres are described in, for example, U.S. Pat. Nos. 6,017,584 and 6,577,433 each of which is incorporated herein by reference in its entirety. In this embodiment, the encapsulated microspheres may include magnetic and/or non-magnetic particles.

The display device may have any suitable overall length and width as desired. The display device may also be made to have any desired height.

A suitable dispersion medium for a magnetic display may include at least one set of particles dispersed in at least one fluid system. The fluid system may be in the liquid or gaseous phase. In one embodiment, the one set of particles is dispersed in a colored fluid system. The particles exhibit a different, contrasting color compared to the color of the fluid. In an embodiment, the fluid system may include two or more immiscible fluids having different densities such that the immiscible fluid having the lower density rests on top of the higher-density immiscible fluid, and the set of particles preferably has a density in between the densities of the two immiscible fluids such that the particles rest at an interface between the two immiscible fluids. Preferably, the particles are magnetic and/or non-magnetic particles as detailed below.

There may be several advantages of using two immiscible fluids. First, the rest position of the particles is at or near the interface of the two immiscible fluids (which may be, for example, near the middle portion of the reservoir) rather than at the bottom of the reservoir in which the display fluid is contained. Switching time is made faster since the particles only need to travel a portion of the distance of the reservoir, e.g., half of the distance. The particles rested at the interface may break loose easily compared to particles resting at the bottom. This can increase the particle stability and the product life. Another suitable fluid system utilizing two fluids is described in U.S. Pat. No. 5,972,493, incorporated herein by reference in its entirety, which describes a low boiling point solvent and a high boiling high solvent.

The fluid system or the particles may be colored by any suitable means in the art, including through the inclusion of any suitable colorants (e.g., dyes and/or dispersible pigments). In another embodiment, two sets of particles are dispersed in a transparent or clear fluid system. The two sets of particles exhibiting different, contrasting color and different charging properties from each other.

The fluid system may be a single fluid, or it may be a mixture of two or more fluids that are either miscible with each other or immiscible. In an embodiment, the fluid system contains from about 50 to about 95% by weight of the dispersion fluid system and about 5 to about 50% by weight of the sets of particles. When two or more types of particles are present, in one embodiment the separate sets of particles are provided in approximately equal amounts, although other ratios are possible.

The fluid system may include any suitable fluid known in the art for display fluids. The fluid may be gaseous, such as a fluid comprising air. The fluid may also be liquid, such as an aqueous or non-aqueous liquid. The choice of fluid may be based on concerns of chemical inertness, density matching to the particles to be suspended therein, chemical compatibility with the particles and/or other reasons. In an embodiment, the viscosity of the fluid is relatively low to permit the particles to move therein, for example under the influence of an electrical and/or magnetic field. In an embodiment, the fluid is dielectric and substantially free of ions.

Organic solvents, such as halogenated organic solvents, saturated linear or branched hydrocarbons, silicone oils, and low molecular weight halogen-containing polymers are a few suitable types of fluids. Useful organic solvents include, but are not limited to, epoxides, such as, for example, decane epoxide and dodecane epoxide; vinyl ethers, such as, for example, cyclohexyl vinyl ether; and aromatic hydrocarbons, such as, for example, toluene and naphthalene. Useful halogenated organic solvents include, but are not limited to, tetrafluorodibromoethylene, tetrachloroethylene, trifluorochloroethylene, 1,2,4-trichlorobenzene, and carbon tetrachloride. Other suitable fluids include decane, dodecane, tetradecane, xylene, toluene, hexane, cyclohexane, benzene, the aliphatic hydrocarbons in the ISOPAR® series (Exxon), NORPAR® (a series of normal paraffinic fluids from Exxon), SHELL-SOL® (Shell), and SOL-TROL® (Shell), naphtha, and other petroleum solvents. Useful examples of silicone oils include, but are not limited to, octamethyl cyclosiloxane and higher molecular weight cyclic siloxanes, poly(methyl phenyl siloxane), hexamethyldisiloxane and polydimethylsiloxane. These materials usually have lower densities. Useful low molecular weight halogen-containing polymers include, but are not limited to, poly(chlorotrifluoroethylene) polymer or KRYTOX® from Dupont. In these nonaqueous fluid designs, a chemically bound, and nondesorbing surface layer on the magnetic particles may be used to prevent aggregation of particles. Specifically, a silica coating on the display particles may prevent aggregation.

Furthermore, suitable fluids may be aqueous having a pH of about 7. Colloidal stability has traditionally been problematic in aqueous solutions around neutral pH. Bare or non-coated magnetite particles generally have an isoelectric point of about pH 7. Coating the magnetic/non-magnetic particles according to one method embodiment, however, lowers the isoelectric point of magnetite to about 3, thereby increasing the aqueous fluid stability at near neutral pH, such that aqueous dispersion mediums may be employed.

Furthermore, the aqueous or non-aqueous fluid system may contain additives such as surface modifiers to modify the surface energy or charge of the particles. Charge control agents, dispersants, colorants and surfactants can also be added to the suspending fluid to improve the performance of the system. As another optional component, the fluid may include one or more charge directors. These charge directors are dissolved or dispersed in the display fluid. These include, for example, the materials identified in, for example, U.S. Pat. Nos. 5,688,624, 5,563,015, 5,262,266 and 5,019,477, each incorporated herein by reference.

Colorants may be added in the dispersion medium so the magnetic display may be colored. Usual pigments and dyestaffs, specially aqueous pigments may be used as the colorants. Such dyestaffs as methylene blue, Congo red, benzo-yellow and such pigments as oil blue, oil green, oil yellow, benzidine yellow, new lactisum (made by DAINISEI CHEMISTRY INC.) may be employed.

Magnetic particles suitable for magnetic displays may be traditional ones well-known in the technical field, for example, black iron oxide, manganese dioxide-bearing iron oxide, chromium dioxide, ferrite, iron or nickel fine powders, iron-nickel alloy, and similar compounds. A mixture of magnetic particles may be used. For example, suitable iron oxides are commercially available from Chitan Industry, Inc., including the TODACARA-KN-320 ® magnetite and the TAROKKUSU BL-220 ® composite iron oxide. The particle diameter of the magnetic powder may be from about 5 nm to about 25 nm. Magnetic particles in this size typically are described as superparamagnetic. Larger magnetic particles with sizes of about 100–1000 μm are generally described as ferromagnetic.

The magnetic particles may be ferrite, gamma-hematite, gamma-ferric oxide, barium ferrite, black iron oxide, etc. Magnetic particles may be formed, for example, from the aqueous solution of $FeCl_3$ and $FeCl_2$. An aqueous ferrofluid is prepared by mixing aqueous solutions of $FeCl_3$ and $FeCl_2$ with ammonia to form a magnetite precipitate.

Magnetic display devices may include non-magnetic particles in addition to the magnetic particles already described. Titanium dioxide, silica and rutile pigments may be suitable materials for the nonmagnetic particles. Non-magnetic particles, such as titania particles and silica particles possess electric and magnetic migration capabilities under application of an external field. These particles tend to be white. The non-magnetic particles may have a diameter of about 0.1 μm to about 1 μm. Larger particles size that about 1 μm may not be desirable as light shading decreases. For example, titania particles with a size of about 0.3 μm may be used because of the high reflection of incident light that such particles display.

A coating technique, as described below, may be used to lower the density of the uncoated magnetic particles according to one method embodiment. Magnetic and even non-magnetic particles used in displays generally have high density. They tend to settle within a display device, which results in the loss of image stability over time. Moreover, bare magnetic and non-magnetic particles (ferro and/or ferromagnetic) have a strong tendency to aggregate, are heavier and require higher magnetic fields for moving within the display device. Aggregation decreases resolution of the display. We have found that coating the particles with silica using a sol-gel process serves to decrease the density of the particles and to decrease aggregation of the particles.

The magnetic particles having an apparent density in the range of about 1.4 $g/cm^3$ to about 2.0 $g/cm^3$ may be close in density to the fluid dispersion that they ensure a stable display. If the magnetic particles have an apparent density greater than about 2.0 $g/cm^3$, they are prone to settle in the fluid dispersion and the display cannot remain stable since it is particularly vulnerable to impact. If the apparent density is less than about 0.5 $g/cm^3$, the magnetic particles will inevitably have an unduly small saturation magnetization and cannot be efficiently attracted by a suitable magnetic field such as a magnetic pen or an erasure magnet.

The uncoated or bare magnetic and non-magnetic particles generally have an apparent density of about 3.0 $g/cm^3$ to about 6.0 $g/cm^3$. For example, the density of magnetite is about 5.1 $g/cm^3$ and titania is 4.0 $g/cm^3$. Silica has a density of about 1.4 $g/cm^3$. Coating the magnetic particles with a layer of silica acts to reduce the apparent density from about 3.0 $g/cm^3$–6.0 $g/cm^3$ to about 1.4 $g/cm^3$–3.0 $g/cm^3$. Coating the non-magnetic particles with a layer of silica acts to reduce the apparent density from about 3.0 $g/cm^3$–6.0 $g/cm^3$ to about 1.4 $g/cm^3$–3.0 $g/cm^3$.

Silica coated magnetic/non-magnetic particles may be coated by a sol-gel process. Any suitable sol-gel processes may be used. For example, the methods described in R. A. Caruso and M. Antonietti, "Sol-Gel Nanocoating: An Approach to the Preparation of Structured Materials," Chem. Mat. 13, 2001, 3272–3282, describes a suitable sol-gel process, herein incorporated by reference. Additionally, the methods described in A. P. Philipse, M. P. B. van Bruggen and C. Pathmamanoharan, "Magnetic silica dispersions: Preparation and stability of surface-modified silica particles with a magnetic core," Langmuir 10, 92 (1994), herein incorporated by reference in its entirety, describes a suitable sol-gel process for silica coating.

Figure 6:
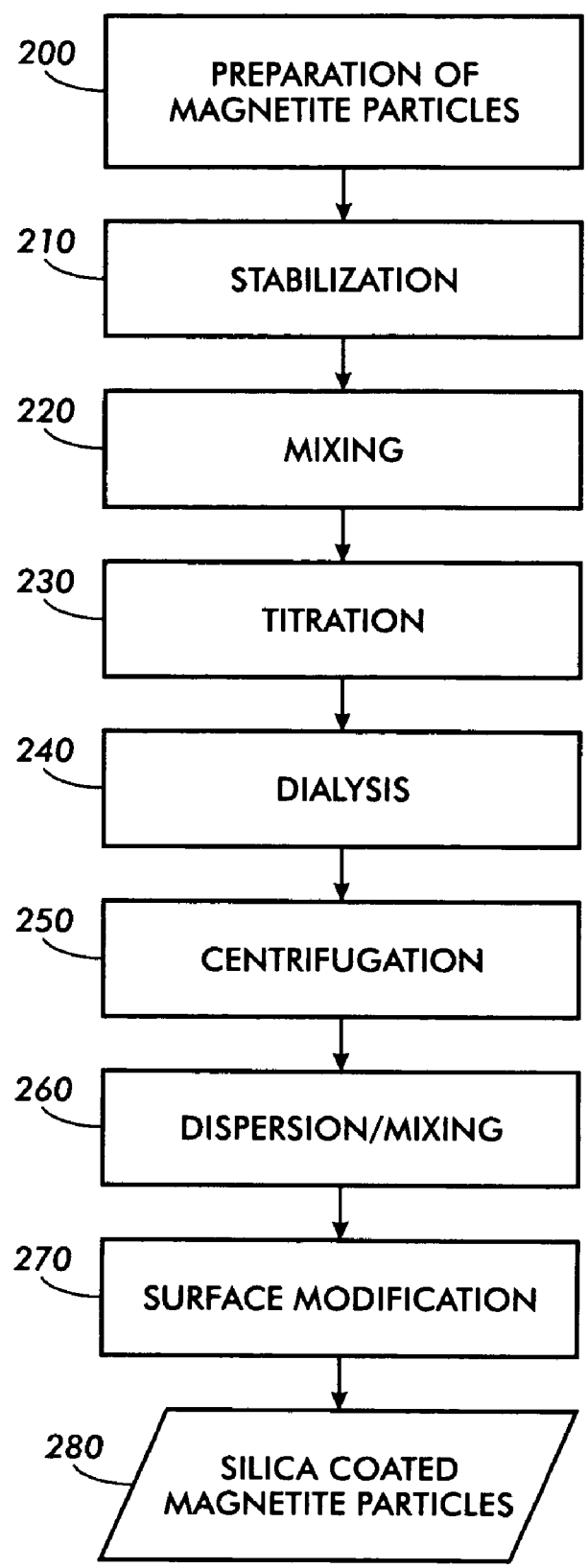
FIG. 6 is a schematic of a method embodiment wherein magnetic particles are formed and silica coated by a sol-gel process.

Monodisperse silica spheres with magnetic/non-magnetic cores may be obtained by silica precipitation from an aqueous sodium silicate solution onto the particles. For example, one suitable process for the preparation and coating of magnetic particles is illustrated in FIG. 6. However, non-magnetic particles may also be coated according to the described methods.

Magnetite particles may be formed 200 by a ferrous solution of $FeCl_2$ and $FeCl_3$, or by any suitable method. Optionally, the magnetite particles may be treated or stabilized 210 first to prepare the surface of the particles for the silica coating. The magnetite particles are diluted with tetramethylammonium in water and the resulting dispersion is filtered 210. To achieve a thin silica coating, a silicate solution may be mixed with these stabilized magnetite particles 220 and slowly titrated 230 with HCl to a pH of about 10. After removal of soluble sodium silicates and aggregated magnetic particles as by dialysis 240 and centrifugation 250, for example, the coated particles may have an isoelectric point (pH) of about 2 to about 4. After these steps, the particles have a thin layer of silica coating (about 0.5 nm). Further coating may be achieved by dispersing 260 these thinly coated particles in ethanol, ammonia, and tetraethoxysilane (TEOS). This mixture may be stirred 260 for in order to achieve coating, for example stirring for about 24 hours at about 20° C. is suitable. This seeding procedure may yield particles with a final coating thickness of up to about 1 μm. Further surface modification 270 may be desirable to afford better dispersion within organic solvents. This surface modification is accomplished with a treatment of ((3-methacryloxy)propyl)trimethoxysilane or octadecyl alcohol. The sol-gel coating process of coating in aqueous solution has been characterized by these hydrolysis and precipitation reactions.

Under the sol-gel coating process, silica coatings of about 0.5 nm to about 1 μm may be supplied to a magnetic/non-magnetic particle 280. However, other sizes are possible. As another example, a silica coating of greater than about 16% of the particle weight may be used.

Coating of particles with silica provides the electrical mobility properties of the silica coating while retaining the optical or colorant functionality of the underlying particle coated therein. Additionally, the density of the underlying particle may be adjusted through the silica coating. Finally, aggregation of the particles is minimized by coating the non-magnetic particles with silica.

Magnetite particles have an isoelectric point of about pH 7, making colloidal stability potential problematic in display systems employing bare magnetite particles in aqueous solution. Silica coating magnetic particles lowers the isoelectric point to about 2 to about 4 thereby increasing the stability of the magnetic particles at near neutral pH. Also, in non-aqueous solutions aggregations of particles may occur, and a chemically bound and hence non-desorbing surface layer of silica may prevent aggregation.

Silica coating the magnetic/non-magnetic particles by a sol-gel method, the thickness of the silica coating may be controlled by varying the concentration of the precursors, the solvent, the content of water, and the pH. Additionally, the resulting density of the coated particles for aqueous and non-aqueous fluid systems may be controlled. Moreover, a high degree of control over the particle size may be achieved by varying the size of the initial core particle. Particle shape and morphology are mainly determined by shape and morphology of starting aggregates.

Therefore, both magnetic and nonmagnetic particles may be coated with silica according to the above described sol-gel method comprising both the hydrolysis and participation steps. Additionally, magnetic display devices may contain a particle system wherein the magnetic particles are silica coated and the non-magnetic particles are of pure silica and/or pure titania.

Figure 2A:
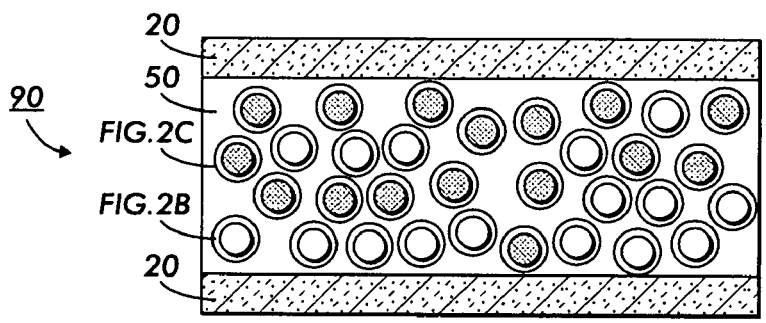
FIG. 2 A illustrates a side view of a display device comprising silica coated magnetic particles and silica coated non-magnetic particles.
FIG. 2B illustrates a silica coated non-magnetic particle.
FIG. 2C illustrates a silica coated magnetic particle.
Figure 2B:
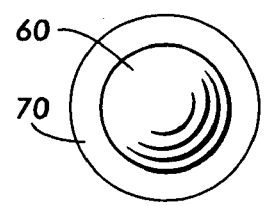
Figure 2C:
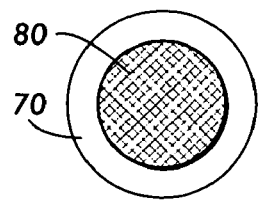

Examples of magnetic displays comprising the silica coated particles are described below. Magnetic display devices may thus be manufactured using silica coated magnetic and/or non-magnetic particles. In one embodiment as illustrated in FIG. 2A, a magnetic display 90 comprises a pair of substrates 20 and a fluid dispersion medium 50 which contains silica coated magnetic particles (FIG. 2B) and silica coated non-magnetic particles (FIG. 2C), wherein the silica coated particles are coated by a sol-gel process. The silica coating 70 may be seen on both the magnetic particles 80 and the non-magnetic particles 60.

Figure 3:
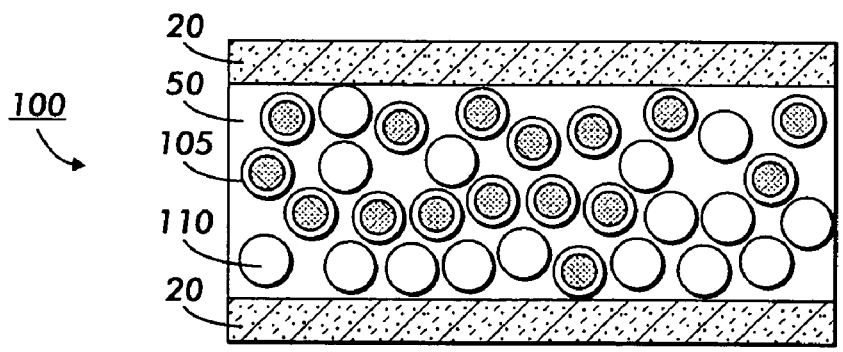
FIG. 3 illustrates a side view of a display device comprising silica coated magnetic particles and non-magnetic particles.

In another magnetic display, as illustrated in FIG. 3, a magnetic display device 100 comprises a pair of substrates 20, and a fluid dispersion medium 50 which contains silica coated magnetic particles 105 and non-magnetic particles 110, wherein the silica coated magnetic particles are coated by a sol-gel process.

Figure 4:
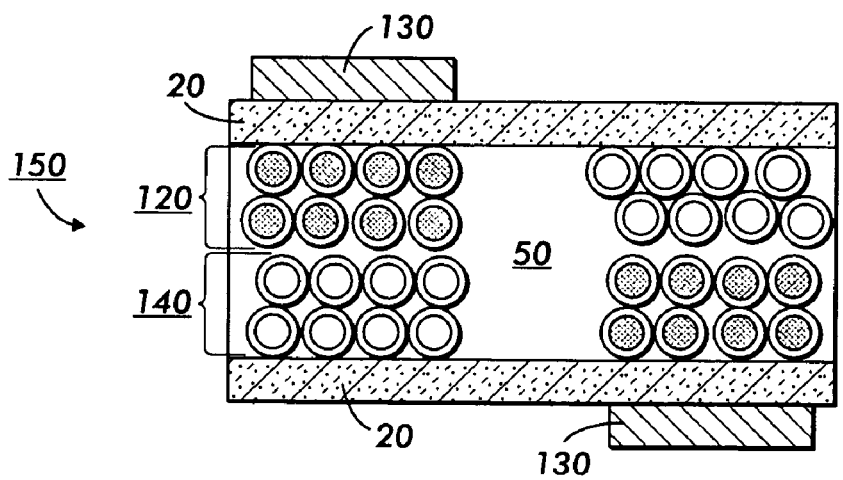
FIG. 4 illustrates a side view of a display device comprising silica coated magnetic particles and silica coated non-magnetic particles.
Figure 5:
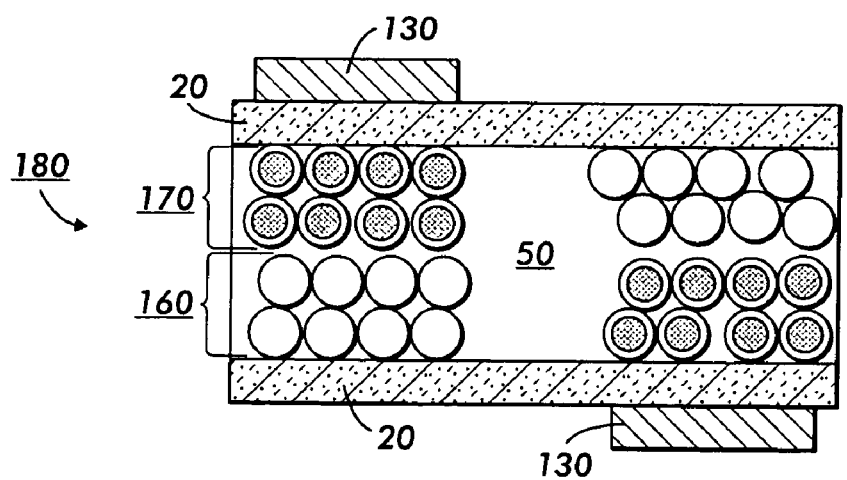
FIG. 5 illustrates a side view of a display device comprising silica coated magnetic particles and non-magnetic particles.

In FIGS. 4 and 5, particle alignment may be seen when a magnetic field 130 is applied to a magnetic display device.

In the two-particle system magnetic display 150 of FIG. 4, both the magnetic particles 120 and non-magnetic particles 140 are silica coated. The magnetic particles 120 respond to the magnetic field 130, while the silica coated non-magnetic particles 140 align in the opposite direction of the applied force. In FIG. 5, a one particle system magnetic display 180 is illustrated, wherein silica coated magnetic particles 170 align with a magnetic field 130, while the non-magnetic particles 160 move in the opposite direction. One skilled in the art may be able to design magnetic displays which incorporate various designs of magnetic and/or electric fields to align the particles into an image display.

Some of the preferred embodiments have been set forth in this disclosure for the purpose of illustration only. However, the foregoing description should not be deemed to be a limitation on the scope of the invention. Accordingly, various modifications, adaptations, and alternatives may occur to one skilled in the art without departing from the spirit and scope of the claimed inventive concept.

What is claimed is:

1. A method of manufacturing a magnetic display device comprising:
    mixing a silicate solution with particles having a density of about 3.0 g/cm$^3$–6.0 g/cm$^3$;
    titrating the mixture with HCl to a pH of about 10;
    removing soluble sodium silicates and aggregated particles to obtain the particles which are thinly coated with silica;
    dispersing the thinly coated particles in ethanol, ammonia, and tetraethoxysilane (TEOS);
    stirring to form silica coated particles having a density of about 1.4 g/cm$^3$–3.0 g/cm$^3$; and
    inserting the particles in a dispersion medium between two substrates of a display device.

2. The method of claim 1, further comprising the step of treating the silica coated particles with ((3-methacryloxy)propyl)trimethoxysilane or octadecyl alcohol before inserting the particles into a dispersion medium.

3. The method of claim 1, wherein silica coated particles have a coating thickness of about 0.5 nm to about 1 μm.

4. The method of claim 1, wherein the particles are treated with tetramethylammonium in water before mixing with the silicate solution.

5. The method of claim 1, wherein the stirring is for about 24 hours at about 20° C.

6. The method of claim 1, wherein the particles are selected from the group consisting of magnetic, non-magnetic, and mixtures thereof.

* * * * *